United States Patent
Delano et al.

(10) Patent No.: US 8,179,372 B1
(45) Date of Patent: May 15, 2012

(54) ELECTRONIC DISPLAY WITH ARRAY CONTEXT-SENSITIVE SEARCH (ACS) TECHNOLOGY

(75) Inventors: Cary L. Delano, Los Altos, CA (US); Arun Jayaraman, San Ramon, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 869 days.

(21) Appl. No.: 12/240,872

(22) Filed: Sep. 29, 2008

Related U.S. Application Data

(60) Provisional application No. 60/976,655, filed on Oct. 1, 2007.

(51) Int. Cl.
*G06F 3/041* (2006.01)
*G06F 3/033* (2006.01)
*G06F 3/02* (2006.01)
*G09G 5/00* (2006.01)
*G09G 5/08* (2006.01)
*G06F 3/00* (2006.01)

(52) U.S. Cl. ........ 345/173; 345/156; 345/157; 345/158; 345/160; 345/161; 345/172

(58) Field of Classification Search .................. 345/156, 345/157, 158, 160, 161, 163, 173
See application file for complete search history.

(56) References Cited

U.S. PATENT DOCUMENTS

| | | | |
|---|---|---|---|
| 4,030,045 A | 6/1977 | Clark | |
| 4,324,950 A | 4/1982 | Strickland | |
| 5,038,325 A | 8/1991 | Douglas et al. | |
| 5,072,171 A | 12/1991 | Eng | |
| 5,115,203 A | 5/1992 | Krett et al. | |
| 5,347,171 A | 9/1994 | Cordoba et al. | |
| 5,491,839 A | 2/1996 | Schotz | |
| 5,694,072 A | 12/1997 | Hsiao | |
| 6,107,886 A | 8/2000 | Kusakabe | |
| 6,215,356 B1 | 4/2001 | Servaes et al. | |
| 6,256,482 B1 | 7/2001 | Raab | |
| 6,304,138 B1 | 10/2001 | Johnson | |
| 6,323,729 B1 | 11/2001 | Sevenhans et al. | |
| 6,417,736 B1 | 7/2002 | Lewyn | |
| 6,486,733 B2 | 11/2002 | Myers et al. | |
| 6,504,426 B2 | 1/2003 | Picha et al. | |
| 6,538,514 B2 | 3/2003 | Harvey | |
| 6,614,310 B2 | 9/2003 | Quarfoot et al. | |
| 6,636,103 B2 | 10/2003 | Wurcer et al. | |

(Continued)

FOREIGN PATENT DOCUMENTS

WO WO 97/23005 A1 6/1997

(Continued)

OTHER PUBLICATIONS

"TDA7563 Multifunction Quad Power Amplifier with Built-In Diagnostics Features," May 2003. ST Microelectronics.

(Continued)

Primary Examiner — Alexander S Beck
Assistant Examiner — Tony N Ngo
(74) Attorney, Agent, or Firm — Hayes and Boone LLP

(57) ABSTRACT

A system and method for efficient computation in the course of locating a position on the face of a touch-screen-equipped display device by limiting the amount of computations to weighted vectors within a range substantially less than the entire range of data input from the touch screen sensors.

8 Claims, 2 Drawing Sheets

U.S. PATENT DOCUMENTS

| | | |
|---|---|---|
| 6,815,988 B2 | 11/2004 | Sanduleanu |
| 6,838,942 B1 | 1/2005 | Somerville et al. |
| 6,853,244 B2 | 2/2005 | Robinson et al. |
| 6,975,175 B2 | 12/2005 | Sanduleanu |
| 6,982,600 B2 | 1/2006 | Harvey |
| 6,987,417 B2 | 1/2006 | Winter et al. |
| 6,993,302 B2 | 1/2006 | Bausov et al. |
| 6,998,914 B2 | 2/2006 | Robinson |
| 7,026,868 B2 | 4/2006 | Robinson et al. |
| 7,034,614 B2 | 4/2006 | Robinson et al. |
| 7,042,284 B2 | 5/2006 | Moons et al. |
| 7,043,213 B2 | 5/2006 | Robinson et al. |
| 7,061,327 B2 | 6/2006 | Doy |
| 7,061,328 B2 | 6/2006 | Doy |
| 7,106,135 B2 | 9/2006 | Makino et al. |
| 7,183,857 B2 | 2/2007 | Doy et al. |
| 7,525,050 B1 * | 4/2009 | Weaver et al. ............. 178/18.04 |
| 2003/0210235 A1 * | 11/2003 | Roberts ......................... 345/173 |

FOREIGN PATENT DOCUMENTS

WO    WO 00/00983 A1    1/2000

OTHER PUBLICATIONS

MAX9730 2.4W, Single-Supply, Class G Amplier, Dec. 2006, Maxim Integrated Products.
International Search Report PCT/US07/064546 dated Feb. 28, 2008.
International Search Report PCT/US07/064545 dated Feb. 28, 2008.
International Search Report PCT/US07/064543 dated Feb. 22, 2008.
International Search Report PCT/US07/064549 dated Feb. 22, 2008.
International Search Report PCT/US07/064548 dated Mar. 19, 2008.

* cited by examiner

ELECTRONIC DISPLAY WITH ARRAY CONTEXT-SENSITIVE SEARCH (ACS) TECHNOLOGY

CROSS-REFERENCES TO RELATED APPLICATIONS

NOT APPLICABLE

STATEMENT AS TO RIGHTS TO INVENTIONS MADE UNDER FEDERALLY SPONSORED RESEARCH OR DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

This invention relates to a technique for determining a location in space. More particularly, the invention is related to technology associated with touch screen displays and is the basis for determining location of a contact on a touch screen display. In a more general sense, the underlying technology of the invention can be applied to the determining of a location in multi-dimensional space, where some of the dimensions relate to parameters other than physical location.

By way of theoretical background, an array of N vectors denoted (XV[1:N]), in an L-dimensional space is a collection of unique signatures which identify a specific characterized system. An example of a system according to the field of invention is a characterization of a touch screen display having N distinguishable touch locations on a two-dimensional display screen. A sample vector (XS) in L-dimensional space, each sample in the vector representing a dimension, is presented as an input from a pair of sensors on each edge of the display to the search subsystem to identify the closest match to the array of N unique signatures. A sample vector typically consists of one of the vectors in the array with additive white noise in each of L dimensions uniformly distributed in the range [−e,e]. The coefficient 'e' is referred to as a noise-splatter coefficient and is typically expressed as a percentage of the dynamic range M of each dimension. The closest match XVM to the sample vector XS is defined as one which has the lowest "score" S of all elements in the array, XV[1:N], where the score is defined as $$S[i] = \sum_{j=1}^{L} |XV[i][j] - XS[j]|^n, \text{ where } n \text{ is an integer}$$

$$XVM = XV[k], k = \text{Index of } \min\{S[i]\}_{i=1}^{i=N}$$

It is already known that this match is achieved by computing the scores for all the array elements and then picking the minimum value. A key requirement is that computing the scores for all vectors is necessary, since each dimension is equally important. This process of computing scores for all the vectors with respect to the sample involves accessing the entire array of N vectors in all the L dimensions every time a new sample arrives. Hence, arriving at a signature match for every new sample requires N×L memory accesses, (N×L) subtractions, (N×(L−1)) additions and (n−1)×N×L multiplications, which is slow and certainly burdensome task.

An exhaustive search such as this to find a match places significant restrictions on the response time to locate a match due to high memory access and computational requirements which grows exponentially with the array length (N) and vector dimension (L). What is needed is a technique for accelerating and streamlining this processing to improve the performance of a touch screen display.

BRIEF SUMMARY OF THE INVENTION

According to the invention, a system and method provide for efficient computation in the course of locating a position on the face of a touch-screen-equipped display device by limiting the amount of computations to weighted vectors within a range substantially less than the entire range of data input from the touch screen sensors.

The invention will be better understood by reference to the following detailed description in connection with the accompanying drawings.

DETAILED DESCRIPTION OF THE INVENTION

Figure 1:
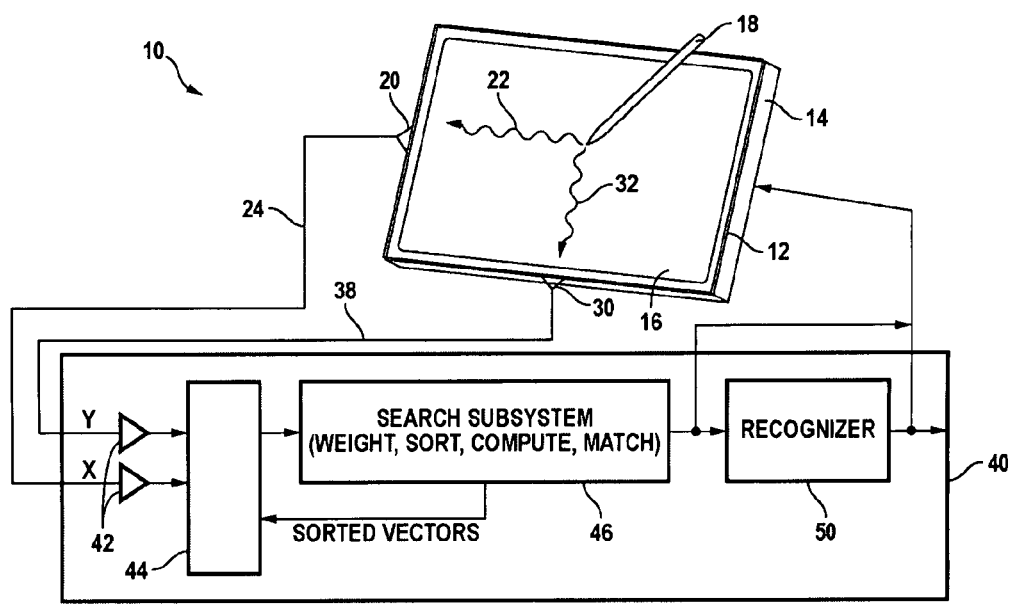
FIG. 1 is a block diagram of a touch screen display system to illustrate the invention.

FIG. 1 is a block diagram of one embodiment of a touch screen display system 10. Any type of touch screen sensor technology can be used. The various techniques include use of sensors and circuitry to monitor changes in a particular state, such as changes in electrical current, changes in the reflection of acoustic waves, changes in beams of infrared light directed across the surface, or use of transducers to measure changes in vibration caused when a finger or stylus hits a screen surface. Other display sensor technology might include cameras to monitor changes in light and shadow. The purpose of the display sensor technology is to generate a collection of vectors over a period of a time sample that can be used to pinpoint a location in sample space and by so doing in the present application, to pinpoint a location of a point on a screen in two spatial dimensions. As a representative touch screen display system 10, a surface 12 of a display device 14 (a flat panel or a CRT) is covered with a sheet 16 having at typically two orthogonal edges sensors 20, 30, the sensors thereby being arranged to sense orthogonal signals 22, 32 from a stylus 18. The sensor 20 for horizontally propagated signals 22 is coupled to a lead 24 and the vertical sensor 30 for vertically propagated signals 32 is coupled to a lead 34 that feed the collection of x-axis samples and y-axis samples, which are typically 200 values per one millisecond sampling period, to a processor 40 where they are converted to digital form by an analog to digital converter 42 and stored in memory 44 as an array of N input vectors to be fed to a search subsystem 46.

Figure 2:
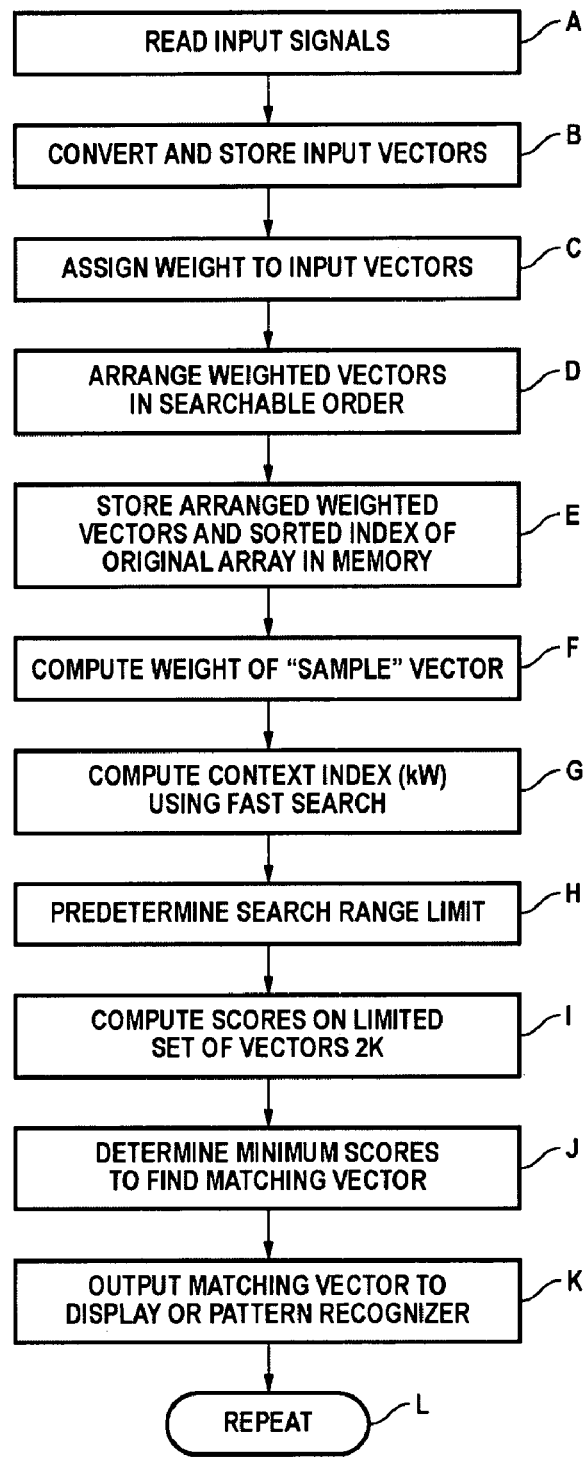
FIG. 2 is a flow chart of a process according to the invention.

FIG. 2 is a flow chart of the method according to the invention. The search technique according to the invention is a solution that significantly minimizes both the computational and memory access requirement to arrive at the exact match for any input vector. According to the invention, the input signals are read (Step A) then converted to digital and stored in memory as input vectors (Step B). Each one of the signature array of input vectors, XV[1:N], is assigned a weight (Step C), which is wXV with respect to an origin vector, XO (which is a fixed vector depending on the distribution statistics of XV or which can simply be a zero vector), defined as $$wXV[i] = \sum_{j=1}^{L} |XV[i][j] - XO[j]|^2$$

This array wXV is then structured or sorted in a searchable order (Step D) (for example, ascending or descending), wYVN, and stored in memory 42 along with the sorted index (SRTix[i]) corresponding to the original array, wXV[i] (Step E). The weight of the sample vector XS {=wXS} is also computed (Step F) as $$wXS = \sum_{j=1}^{L} |XS[j] - XO[j]|^2$$

Using a fast search algorithm, such as a binary search, the context index kw, which is the result of the minimum weight-score as defined by WS is then computed (Step G) as $$WS[i] = |wXV[i] - wXS|$$

$$kw = \text{Index of min}\{WS[i]\}_{i=1}^{i=N}$$

Considerable time and storage space can be saved in this manner. Structured ordering of wXV[1:N] and an algorithm such as a binary search requires merely $\log_2(N)$ subtractions. Other faster search methods of arriving at this context index are possible, for example by using a polynomial fit for the organized weights. This short search procedure involving $O(\log(N)+L)$ or less computations (including multiplications, additions and subtractions) is crucial in minimizing the number of score computations necessary to arrive at the exact match. The value of 'kw' is referred to as the "context" of sample XS.

A search range value K for k is determined (Step H). This value could be predetermined before computation by an analysis of the signature array XV as well as the permitted noise-splatter coefficient. As an example, a 1% noise splatter coefficient (e) can result in K being as low as N/40, resulting in 20× reduction in the number of score computations needed to determine the correct location. To make best use of the context 'kw' only the vectors whose indices are present in the SRTix[kw-K,kw+K] subset of SRTix array will be used for score computation. Once the context index kw is determined, the score computations are computed (Step I) over the search range, the score computations being restricted to the range 2*K vectors (out of a total of N) based on magnitude of the noise {-e, e}. Noise can be present in each of the L dimensions of the vector. The minimum of the scores is then identified (Step J). The minimum of these scores indicates the index k of the matching vector XVM (=XV[k]). The matching vector is then output to a pattern recognizer 50 for further processing and/or the output display 14 (Step K), after which the process is repeated (Step L).

This algorithm is most effective when the noise-splatter coefficient is not very large. Large noise-splatter coefficients typically represents non-physical systems.

Below is a MATLAB script that illustrates one embodiment of the invention that has been used to verify the efficacy of the foregoing method, using as parameters a 1% noise-splatter coefficient (e=2) on 5% of signature array vectors and a signature array of 4332×1024 (N=57×76=4332, L=1024, M=256 (8-bits)).

```
% ACS Technology Test Script %
fid=fopen('SIGN_ARRAY__1024x4332.mat','r');
VLEN=1024;
VNUM=4332;
MEMSIZE=VLEN*VNUM;
XM=fread(fid,MEMSIZE);
XV=reshape(XM,VLEN,VNUM)';
size(XV)
ORIG=0;
CENTR=ORIG*ones(VNUM,VLEN);
XVc=XV-CENTR;
wXV=sum(abs(XVc).^2,2);
size(wXV)
t=1:VNUM;
[wYV,SRTix]=sort(wXV,'ascend');
% Generate random sample vector
% Loop once for every vector with noise
CNTXT_VEC=[ ];
MATCH_VEC=[ ];
acs_pos=0;
for ix=1:228,
t1=1:VLEN;
NOISE=round(4*(rand(size(t1))-0.5));
XS=XV(ix*19,:)+1*NOISE;
% display('Sample Vector Weight')
wXS=sum(XS.^2,2)
% Calculate all scores and find match by brute force
   XSE=[ ];
   for i=1:VNUM,
   XSE=[XSE;XS'];
   end
   XS2=reshape(XSE',VLEN,VNUM)';
   SCRVEC=XV-XS2;
   SCRV=sum(abs(SCRVEC),2);
   [SORT_SCRV,SCR_INDX]=sort(SCRV,'ascend');
   BRUTE_MIN_INDX=SCR_INDX(1);
%%%%%%%%%%%%%%%%%%%%%%%
   FIG. (1)
   wXS_t=wXS*ones(size(t));
   subplot(2,1,1)
   plot(t,wYV,'+',t,wXS_t);
   grid on
% Find context index, kw
   WS=abs(wYV-wXS_t');
   [DMY,BINSRCH_INDX]=sort(WS,'ascend');
   display('Closest index for weight metric')
   kw=BINSRCH_INDX(1)
   K=100;
   FIRST=kw-K;
   LAST=kw+K;
   if (FIRST<=1)
   FIRST=1;
   end
   if (LAST>=VNUM),
   LAST=VNUM;
   end
   zoom_t=FIRST:LAST;
   MATCH_IX=zoom_t(1);
   subplot(2,1,2)
   ploht(zoom_t),INDX(zoom_t),'*');
   grid on
   for i=1:length(zoom_t),
   if (INDX(zoom_t(i))==BRUTE_MIN_INDX)
   MATCH_IX=zoom_t(i)
```

```
end
end
BRUTE_MIN_INDX
if (INDX(MATCH_IX)==BRUTE_MIN_INDX)
display('Exact Match found by ACS');
acs_pos=acs_pos+1;
end
CNTXT_VEC=[CNTXT_VEC;kw];
MATCH_VEC=[MATCH_VEC;MATCH_IX];
end
FIG. (2)
tn=1:length(CNTXT_VEC);
plot(tn,CNTXTVEC-MATCH_VEC)
grid on
title('Distance of MATCH index (k) from CONTEXT index (kw)')
xlabel('Sample Vector #')
print-dpsc acsx.ps
```

Figure 3:
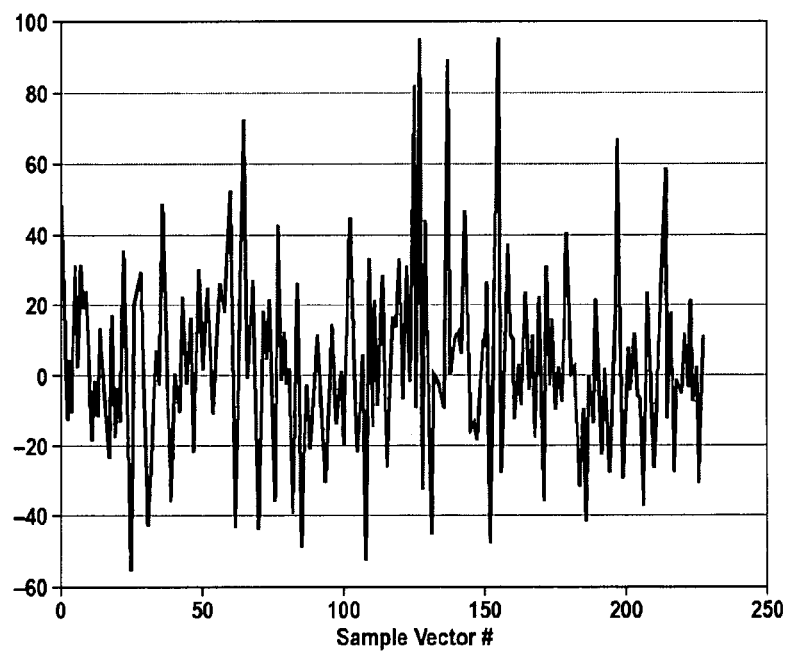
FIG. 3 is a graph illustrating operation of the invention.

FIG. 3 is a graphic output of the foregoing method showing a plot of distance from the context for a sample of 228 vectors out of 4332. The economy of this approach should therefore be apparent.

The invention has been explained with reference to specific embodiments. Other embodiments will be evident to those of skill in the art. It is therefore not intended that this invention be limited, except as indicated by the appended claims.

What is claimed is:

1. An electronic display system having a touchscreen overlay sheet on a display device comprising:
   an input signals generator responsive to a physical touching of a location on the touch screen overlay sheet over a sample period to obtain a plurality of input sample signals;
   a converter for converting the input sample signals to digital input vectors forming a multidimensional array;
   code for assigning a weight to each of the digital input vectors with respect to an origin corresponding to a position on the overlay sheet to obtain weighted vectors;
   code for structuring the weighted vectors in a sorted and searchable order and creating a sort index corresponding to the sorted and searchable order of the weighted vectors;
   code for storing the weighted vectors in searchable order in a memory with the sort index;
   code for computing weight of a sample vector;
   code for computing a context value for a sample vector over a predefined and limited search range, the context value being a result of minimum Weight score;
   code for iteratively computing minimum weight scores using the context value to establish a location value representative of the location of the physical touching; and
   code for outputting the location value to an output utilization subsystem for establishing a physical location on the electronic display device.

2. The system according to claim 1 wherein the weight assigning code comprises code for summing squares of the digital input vectors according to the expression:

$$wXV[i] = \sum_{j=1}^{L} |XV[i][j] - XO[j]|^2,$$

wherein:
   L is an integer corresponding to the number of dimensions in a multi-dimensional space; and
   i is an integer.

3. The system according to claim 2 wherein the code for weighting of the sample vector comprises code for summing squares of weighted vectors according to the expression:

$$wXS = \sum_{j=1}^{L} |XS[j] - XO[j]|^2.$$

4. The system according to claim 2 wherein the context value comprises an index term kw obtained by executing code for summing squares of weighted vectors according to the expression:

$$WS[i] = |wXV[i] - wXS|$$

$$kw = \text{Index of min}\{WS[i]\}_{i=1}^{i=N},$$

wherein
   N is an integer number of distinguishable touch locations on a two dimensional screen.

5. A method for establishing a physical location on an electronic display device having a touch screen overlay sheet on a face of the display device, the method comprising:
   receiving input signals as a result of a physical touching of a location on the touch screen overlay sheet over a sample period to obtain a plurality of input sample signals;
   converting the input sample signals to digital input vectors forming a multidimensional array;
   assigning a weight to each of the digital input vectors with respect to an origin corresponding to a position on the overlay sheet to obtain weighted vectors;
   structuring the weighted vectors in a sorted and searchable order;
   creating a sort index of the weighted vectors in the sorted and searchable order;
   storing the weighted vectors in the sorted and searchable order in a memory with the sort index;
   computing weight of a sample vector;
   computing a context value for a sample vector over a predefined and limited search range, the context value being a result of minimum weight score;
   iteratively computing minimum weight scores using the context value to establish a location value representative of the location of the physical touching; and
   outputting the location value to an output utilization subsystem.

6. The method according to claim 5 wherein the weight assigning step comprises summing squares of the digital input vectors according to the expression:

$$wXV[i] = \sum_{j=1}^{L} |XV[i][j] - XO[j]|^2,$$

wherein:
   L is an integer corresponding to the number of dimensions in a multi-dimensional space; and
   i is an integer.

7. The method according to claim 6 wherein the weight of the sample vector comprises summing squares of weighted vectors according to the expression:

$$wXS = \sum_{j=1}^{L} |XS[j] - XO[j]|^2.$$

8. The method according to claim 7 wherein the context value comprises an index term kw obtained by summing squares of weighted vectors according to the expression:

$$WS[i] = |wXV[i] - wXS|$$

$$kw = \text{Index of } \min\{WS[i]\}_{i=1}^{i=N},$$

wherein

N is an integer number of distinguishable touch locations on a two dimensional screen.

\* \* \* \* \*